May 28, 1929.  L. BLOCH  1,714,758
CUT-OFF DEVICE FOR BATH FIXTURES
Filed Feb. 6, 1926
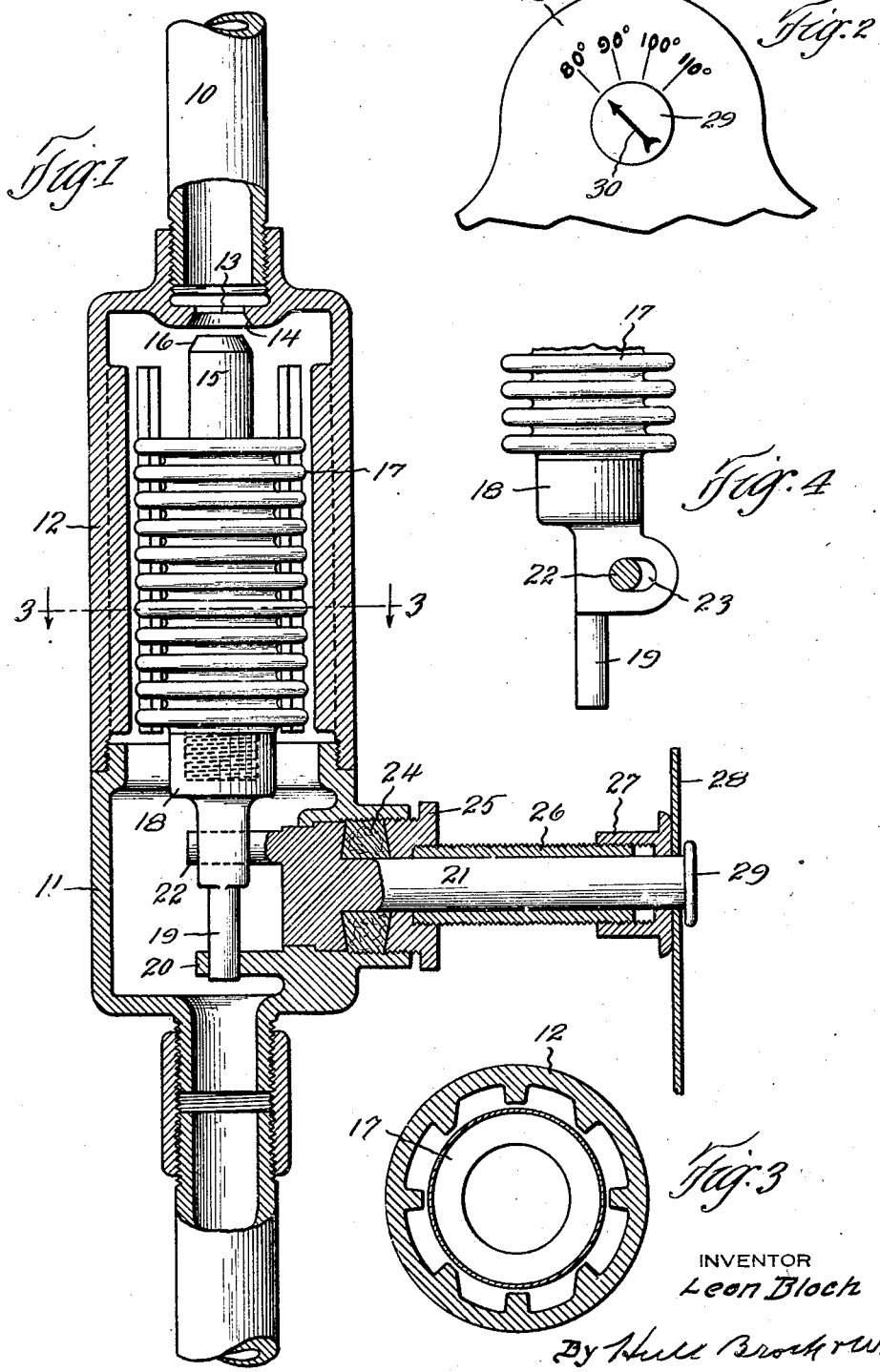
INVENTOR
Leon Bloch
By Hull Brock & West
Attys.

Patented May 28, 1929.

1,714,758

UNITED STATES PATENT OFFICE.

LEON BLOCH, OF CLEVELAND, OHIO, ASSIGNOR TO THE REPUBLIC BRASS COMPANY, OF CLEVELAND, OHIO, A CORPORATION OF OHIO.

CUT-OFF DEVICE FOR BATH FIXTURES.

Application filed February 6, 1926. Serial No. 86,437.

This invention relates generally to plumbing fixtures and more particularly to a cut-off to be used in connection with either the tub or shower of a bath fixture appliance.

At the present time, so far as I am aware, there is no automatic cut-off employed in connection with mixing valves and consequently there are times when, owing to an excess of hot water, the mixture delivered to either the tub or the shower is entirely too hot with the result that accidents such as scalding are likely to occur.

The object of my invention is to provide a simple and efficient means which can be adjusted or regulated so that in case the temperature of the water reaches a predetermined point the supply will be automatically cut off when that temperature is reached thereby preventing any excess in that direction.

With this object in view the invention consists in the novel features of construction and combination of parts all of which will be fully described hereinafter and set forth in the appended claims. In the drawings forming part of this specification, Fig. 1 is a vertical sectional view partly in elevation showing the practical application of my invention; Fig. 2 is a detail view showing a portion of the indicating dial and the pointer carried upon the end of the shaft of the regulating mechanism; Fig. 3 is a detail sectional view on the line 3—3 of Fig. 1; and Fig. 4 is a detail view illustrating in detail the actuating and guiding mechanism.

Referring to the drawings, 10 indicates a pipe in which is interposed a casing preferably constructed of a lower section 11 and an upper section 12 the said upper section having an opening 13 in the upper end thereof surrounded by a valve seat 14. A valve in the form of a plug 15 having a tapered end 16 is adapted to seat upon 14 and close the opening 13 whenever the temperature reaches or exceeds a predetermined point. This plug 15 is connected to the upper end of an expansible member 17 which is preferably in the nature of a sylphon bellows and to the lower end of this expansible member 17 is a depending stem 18 having a reduced lower end 19 which works in an apertured partition or lug 20 formed within the lower portion 11 of the casing and turning in this lower portion of the casing is a shaft 21 having a crank pin 22 which engages a horizontally elongated slot 23 of the depending stem 18 and by turning the shaft 21 the depending stem 18 is moved up or down so that the relative positions of the expansible member and plug 15 are shifted with reference to the opening 13.

The shaft 21 is enlarged at its inner end and is circular in form fitting into the correspondingly shaped opening in the casing. A packing ring 24 surrounds the stem and likewise a gasket or nut 25, and screwed into this gasket or nut 25 and surrounding the shaft or stem 21 is a tubular shaft or stem 26 which is threaded into a cap nut 27 and a disk or dial 28 is held between the knob 29 upon the end of the shaft or spindle 21 and the cap nut 27. The knob 29 has a pointer 30 placed thereon and the dial or disk 28 has degree marks placed thereon, Fig. 2 showing 80° 90°, 100° and 110°. The knob is indicated as turned so as to bring the pointer 30 opposite 80°.

Thus when 80° is reached the plug 15 carried at the upper end of the expansible member will seat and close the opening 13 thereby cutting off the supply of water and preventing a temperature in excess of 80°, it being understood that by shifting the position of the shaft or spindle 21, the position of the expansible member is so shifted that 80° of temperature will cause the same to expand and close the opening 13. When the knob is turned so as to bring the pointer opposite 110°, the relative positions of the parts are so changed that it will require 110° of temperature to effect a sufficient expansion to cause the closing of the opening 13.

It will, of course, be understood that the shape and arrangement of the various elements herein disclosed can be changed or varied considerably without disturbing the relative positions of the various parts and consequently the effective operation thereof, and it will also be understood that this device can be interposed at any desired portion of the system.

It will thus be seen that I provide a very simple and efficient regulating and cut-off device whereby an excessive temperature of water delivered to the bath apparatus is prevented.

Having thus described my invention, what I claim is:—

1. In a device of the kind described, a casing having inlet and outlet openings, a valve for closing one of said openings, an expansible member to which said valve is rigidly connected, a depending stem attached to the lower end of the expansible member, said stem being carried in the casing and a shaft or spindle having a crank arm operatively engaging the depending member for varying the position of the expansible member and valve with reference to the opening which said valve closes, said valve, expansible member and depending stem lying wholly within said casing.

2. A device of the kind described comprising a casing having inlet and outlet openings, a valve for closing one of said openings, an expansible member to which said valve is connected, a depending stem connected to said expansible member, a shaft or spindle having a crank arm operatively engaging the depending stem to vary the position of the expansible member and valve with reference to the opening which said valve closes, and a lost motion connection between said crank arm and depending stem.

3. A thermostatic valve of the class described comprising a casing having an inlet opening at one end and an outlet opening at its opposite end, a valve for closing one of said openings, an expansible member to which said valve is connected, a depending stem attached to the lower end of said expansible member, said valve, expansible member and valve stem being disposed within said casing between said inlet and outlet openings, means for directing the movement of said valve and means extending through a wall of said casing transverse to the axis of the valve and stem and operatively connected with said valve stem for adjusting the position of said valve with respect to the opening which it closes.

4. A thermostatic valve of the class described comprising a casing having an inlet opening in one end and an outlet opening in its opposite end, a valve arranged within said casing and adapted to close one of said openings, an expansible member to which said valve is rigidly connected, a depending stem attached to said expansible member, means for supporting said valve and for adjusting the position of the same with respect to the opening which it closes, said expansible member being disposed between said inlet and outlet openings and in the path of flow of fluid passing through said casing said valve supporting means arranged transverse to the axis of said valve and expansible member.

5. A thermostatic valve of the class described comprising a casing having oppositely disposed inlet and outlet openings, a valve disposed within said casing and having an expansible member rigidly connected therewith, a depending stem attached to said expansible member, a guide for directing the movement of said valve, means for supporting said valve and for adjusting the position of the same with respect to the opening which it closes, said valve and expansible member being disposed in the path of flow of fluid through said casing said valve supporting means arranged transverse to the axis of said valve and expansible member.

6. A thermostatic valve of the character described comprising a casing having aligned inlet and outlet openings in the opposite ends thereof, a valve arranged within said casing for closing one of said openings, an expansible member arranged within said casing and having one end connected with said valve, a stem connected with the opposite end of said expansible member, said valve, expansible member and stem being disposed within said casing between said inlet and outlet openings, means for directing the movement of said valve and means extending through the wall of said casing transverse to the axis of said valve and stem and operatively connected with said valve stem for adjusting the position of said valve with respect to the opening which it closes.

In testimony whereof, I hereunto affix my signature.

LEON BLOCH.